Figure 1:
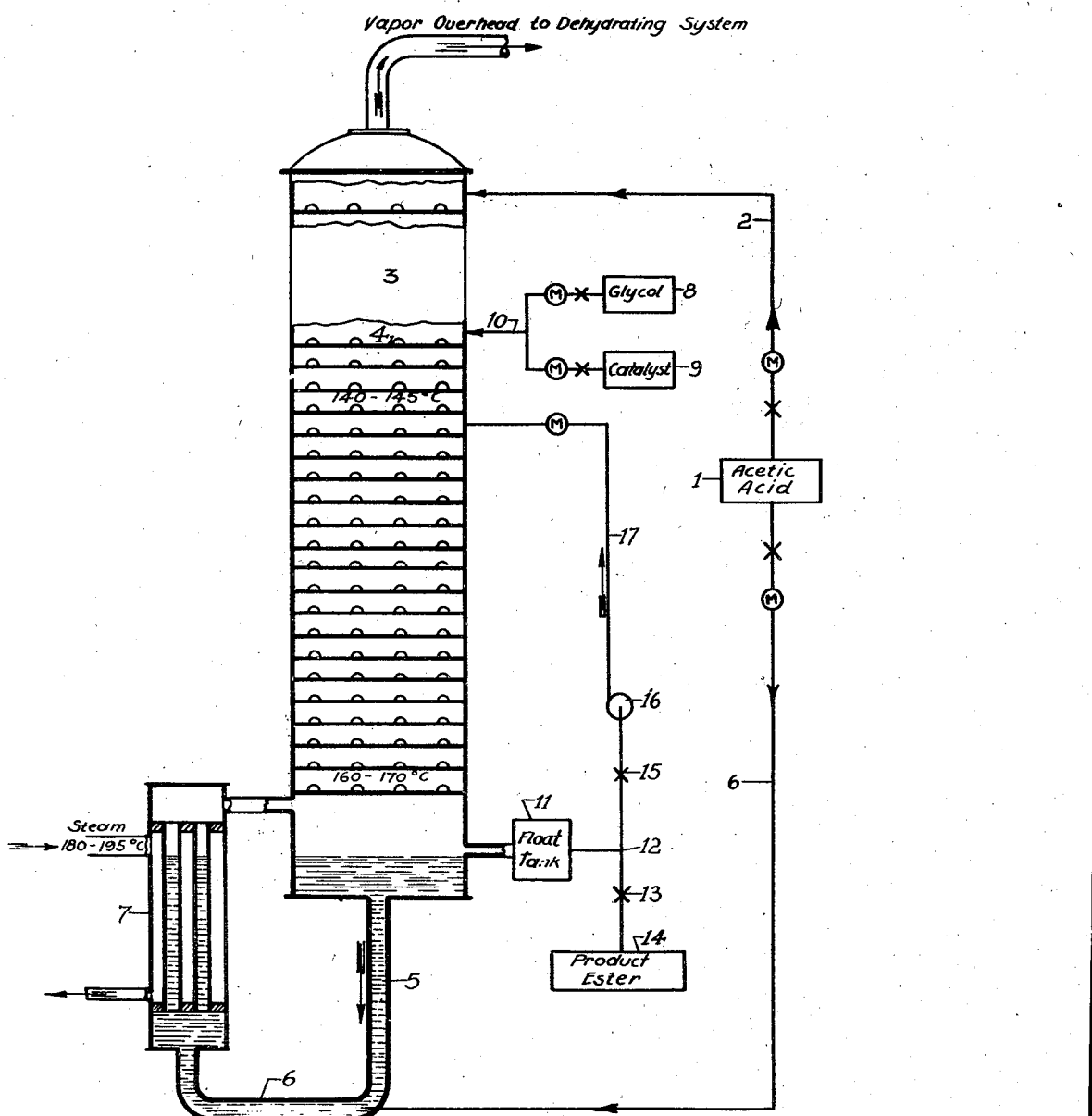

Sept. 2, 1947.         H. W. GRUBB ET AL         2,426,968
METHOD OF ESTERIFYING POLYHYDRIC ORGANIC COMPOUNDS
Filed Nov. 6, 1944

INVENTORS
Henry W. Grubb, Leo M. O'Hara,
Kenton Atwood
BY Arthur H Robert
Atty

Patented Sept. 2, 1947

2,426,968

UNITED STATES PATENT OFFICE 2,426,968

METHOD OF ESTERIFYING POLYHYDRIC ORGANIC COMPOUNDS

Henry W. Grubb, Leo M. O'Hara, and Kenton Atwood, Louisville, Ky., assignors to Joseph E. Seagram & Sons, Inc., Shively, Ky., a corporation of Indiana Application November 6, 1944, Serial No. 562,192

5 Claims. (Cl. 260—488)

1

The present invention relates to the production of relatively high boiling esters from intermediate boiling polyhydric organic compounds and low boiling monocarboxylic acids either aliphatic or aromatic. While the invention is applicable to a variety of reactants, for the sake of clarity, it is hereinafter described in connection with the preparation of the relatively high boiling diacetate of 2,3 butylene glycol (193° C.-379° F.) from the intermediate boiling 2,3 butylene glycol (182° C.-360° F.) and the low boiling acetic acid (118° C.-224° F).

More particularly the invention relates to a process for esterifying the glycol continuously. The problem of effecting the esterification continuously, requires, for its successful solution, a suitable residence time of reactants in the column, a suitable catalyst, and the maintenance of temperatures in the reaction zone which are high enough to accelerate and promote the reaction and yet low enough to avoid appreciable decomposition of the reactants or product. It has generally been considered that these conditions could be maintained in a conventional bubble cap column having deep plates by operating the column as a distillation column, feeding the reaction mixture into the upper part of the column, condensing and refluxing the overhead and withdrawing the diacetate from the bottom of the column. This, however, has not proven to be the case. On the contrary, it has been found that the temperature gradient in the reaction zone is too great and, as a result, when necessary temperatures are maintained at the bottom of the reaction zone, the upper temperatures are much too low. No doubt this condition could be remedied by externally heating the column, along its length, sufficiently to produce the desired temperature range in the reaction zone and thereby promote the reaction. Because of the practical difficulties involved in the external application of heat, it is desirable to avoid it if possible.

The present invention relates to the continuous production of high boiling esters in a distillation or fractionating column and has for its principal object the provision of a novel and simple method for obtaining and maintaining appropriate reaction temperatures in the reaction zone of the column. Stated otherwise the principal object is to maintain a range of substantially higher ambient temperatures throughout the reaction zone than could be maintained in a distillation or fractionating column operated in the conventional manner.

2

Other objects of the invention are: to provide a system which is continuous in that reactants are continuously fed to the column and the product is continuously withdrawn from the column; to provide a system which permits the continuous removal of an overhead containing other products of the reaction, such as water of reaction, but is substantially free of product esters; to provide a system which eliminates the necessity of using large kettles and reaction vessels aside from the distillation column itself; and finally to provide a system involving little or no decomposition of the ester while producing a product ester which is substantially 100% pure.

Our invention resides in the discovery that the foregoing objectives can be achieved by feeding an intermediate boiling hydroxy compound such as glycol, along with the catalyst into the column at the top of the reaction zone while feeding an excess of the low boiling acid, as a superheated vapor, into the bottom of the reaction zone. With this arrangement, it is a comparatively easy matter to obtain and maintain appropriate temperatures in the reaction zone ranging from 160 to 170° C. at the base, and 140 to 150° C. adjacent the top of the zone at a point a few plates below the feed plate. In the operation of the system, the acetic acid is vaporized by boiling a mixture of the acid and of the base liquor containing the diacetate. Preferably, also the acid is fed to the top of the column as reflux in order to reduce, to insignificant proportions, the amount of high boiling and intermediate materials in the overhead. Once equilibrium is reached in the operation of the system, the water of reaction and excess acid are continuously withdrawn from the column as overhead while a mixture of pure diacetate and acetic acid is continuously withdrawn from the base of the column. The overhead acetic acid may be readily dehydrated while the base diacetate may be readily separated from the acetic acid, the acid in both cases being recycled in the system.

The single figure schematically illutrates a suitable system for practicing the present invention.

It may facilitate a more thorough appreciation of the present invention to explain the operation of the system shown in the figure beginning with a cold and empty column. Accordingly glacial acetic acid is fed from a suitable source 1 through a reflux line 2, to the top plate of the column 3. The column 3 has what may be termed a rectifying zone extending upwardly from the feed section or feed plate 4 preferably to the top of the column and a reaction zone extending downwardly from the feed section or plate, preferably to the bottom of the column.

In the rectifying zone, there should be enough plates to prevent the glycol and diacetate from coming off with the overhead. Normally 5 to 9 plates are sufficient for this purpose. In the reaction zone, the plates must provide a liquid retention or holding time of sufficient duration for reaction purposes. For the glycol-acetic acid reaction, this time approximates 105–120 minutes; hence 21 plates, averaging a retention time of 5–6 minutes per plate, are indicated in the reaction zone of the column illustrated.

The acetic acid, fed into the top of the cold column, flows downwardly through the rectifying and reaction zones filling all plates in the column and finally entering the bottom discharge pipe 5. At this point, heat is applied to the column and additional acid fed to the bottom of the column at a slow rate from acetic source 1 through feed line 6 and heater 7.

The heater 7 normally contains liquid from the system up to a level determined by the level in the bottom of the column. It normally operates, on the heating medium or steam side, at a temperature ranging from 180 to 195° C. During the warm up period, the heater boils the acetic acid and directs the vapors into the column. Ultimately the acid throughout the column is brought to a boiling condition. When this occurs, the column is ready to receive the glycol and catalyst.

The 2,3 butylene glycol from source 8 and the catalyst (sulphuric acid) from source 9 are fed through line 10 onto feed plate 4, at the normal rate, while the flow of acetic acid from source 1 through line 6 and heater 7, is now raised from its initial low rate to the normal rate. While the reaction calls for a 2 to 1 molar ratio of acid to glycol, an excess of acid is essential to secure the best results. We, therefore, prefer a 100% excess of acid; hence employ a molar ratio of 4 to 1. Accordingly, for each 240 pounds (four pound mols) of acid fed to the bottom of the column, 24 pounds (0.4 pound mol) of acid are fed to the top of the column for reflux purposes while 90 pounds (one pound mol) of glycol together with 1 to 1½ pounds of catalyst are fed onto feed plate 4. These values may, of course, be varied somewhat.

With the institution of the glycol and catalyst feed, the reaction begins and as it proceeds, the reactants gradually spread downwardly through the reaction zone correspondingly raising the boiling temperature and thereby causing the temperature to rise. Ultimately some "preliminary" diacetate reaches the bottom of the column and this diacetate, together with acetic acid, circulates through the lines 5 and 6 into heater 7 causing the boiling point in the heater to rise above the boiling point of acetic acid. As a result, the acetic acid vapors are present at a superheated temperature, that is to say, a temperature higher than the boiling point of acetic acid for the pressure involved.

The preliminary diacetate collects rapidly enough to overflow the bottom level indicated. The float tank 11 is arranged to direct the overflow into line 12 from which it may be drawn off through valve 13 into product ester receiver 14. But the preliminary diacetate is not the product ester sought since the column is not yet in equilibrium and the proper (higher) temperatures have not yet been reached in the reaction zone. The time required to reach equilibrium at the proper temperatures may be reduced by recirculating the overflow of preliminary diacetate from line 12 through valve 15, pump 16 and line 17 back into the column a few plates below the feed plate. This enriches the liquor in the reaction zone and makes higher plate temperatures possible.

As this operation proceeds, the column is finally brought to equilibrium with a base temperature at some more or less fixed value between 160 and 170° C. and a temperature of 140 to 145° C. at a point adjacent the top of the reaction zone, say 4 or 5 plates below the feed plate. At this point recirculation is stopped, if it has not previously been stopped, and the continuous withdrawal of the product ester instituted through float tank 11, line 12 and valve 13. The product withdrawn does not contain any glycol or any monoacetate but is composed wholly of the diacetate and a small quantity of acetic acid. The overhead at this point contains water of reaction plus excess acetic acid and minor values of other low boiling materials. It may also contain a very small amount of diacetate, but even this does not represent a loss, since it remains with the acetic acid when the latter is dehydrated; hence will be returned to the system when such acid is recycled.

Careful control of the bottom temperature at its fixed value is desirable because, progressively above it, progressively greater decomposition is encountered in which butadiene is formed while, progressively below it, there is a progressive insufficiency of heat for reaction purposes. Should this temperature go above the fixed value, the the steam is decreased in order to decrease the feed rate of acetic acid and correspondingly decrease the boil up of acetic acid in the reaction zone whereby progressively more of the acid is retained in the reaction zone in liquid phase. Should the base temperature drop, the steam is increased to increase the boil up of acetic acid. The amount of acetic acid in the product ester draw off varies inversely with the degree of boil up.

The acetic acid employed in the esterification should be substantially free of water in order to insure that the reaction will be complete and that partially esterified glycol will not be obtained. If water is present in the acid, a small amount of acetic anhydride may be fed to the bottom of the column along with the acetic acid to remove the water from the sphere of the reaction and thereby insure the completion of the reaction. If the product diacetate continuously obtained from the column is immediately employed in another reaction and a loss of acetic acid experienced, these losses may be made up in a convenient manner by the addition of acetic anhydride at the base of the esterification column.

The present invention is applicable to the continuous production of other relatively high boiling esters from other intermediate boiling di and polyhydric organic compounds and low boiling monocarboxylic acids. For example, di hydric compounds, such as ethylene glycol, propylene glycol and 1,3 butylene glycol, and polyhydric compounds, such as glycerine, may be employed; all of these compounds being generically designated as polyhydric compounds. Examples of other suitable aliphatic acids, in addition to acetic, are formic, propionic, butyric and isobutyric, while examples of suitable aromatic acids are benzoic, orthotoluic and para-toluic. The volatile organic acid employed should have a boiling point substantially below that of the hydroxy compound and must be chemically stable at existing temperatures in the column.

In the application of this invention to different hydroxy compounds and monocarboxylic acids, it will be appreciated that different liquid retention times and different predetermined base temperatures will be required in the reaction zone. In any event, however, a mixture of the intermediate boiler and catalyst will be initially fed into the top of the reaction zone while an excess of the low boiling acid, as a superheated vapor having a temperature below the boiling point of the product ester, will be fed into the bottom of the reaction zone until equilibrium is established with the appropriate predetermined base temperature at the bottom of the reaction zone. Once equilibrium is established the withdrawal of the product ester from the bottom of the reaction zone may be instituted while continuing the top and bottom feeds as before but controlling the bottom feed at a rate such as to maintain the appropriate predetermined base temperature.

Having described our invention, we claim:

1. A process for continuously producing a relatively high boiling ester from 2,3 butylene glycol and acetic acid in a column still having a reaction zone extending downwardly from a feed section and providing a liquid retention time sufficient for reaction purposes, comprising: feeding 2,3 butylene glycol downwardly into the reaction zone from the feed section in the presence of a catalyst; feeding an excess of acetic acid, as a superheated vapor at a temperature below the boiling point of the product ester, upwardly into the bottom of the reaction zone; and withdrawing product ester from the bottom of the column in the form of bottom liquor, a portion of the higher boiling bottom liquor being continuously vaporized with the added acid to insure superheating of the latter to the desired temperature.

2. A process for continuously preparing an ester of relatively high boiling point in a column still having a reaction zone extending downwardly from a feed section and providing a liquid retention time sufficient for reaction purposes, comprising: flowing a hydroxy organic compound downwardly into the reaction zone of the column from the feed section in the presence of a catalyst, the hydroxy compound being of a boiling point below that of the boiling point of the product ester and known to be capable of reacting with a monocarboxylic acid of a boiling point lower than the boling point of the hydroxy compound to form the relatively high boiling ester; feeding an excess of the low boiling acid, as a superheated vapor at a temperature below the boiling point of the product ester, upwardly into the bottom of the reaction zone; and withdrawing product ester from the bottom of the reaction zone.

3. A process for continuously preparing an ester of a relatively high boiling point in a column still having a reaction zone extending downwardly from a feed section and providing a liquid retention time sufficient for reaction purposes, comprising: flowing a hydroxy organic compound downwardly into the reaction zone of the column from the feed section in the presence of a catalyst, the hydroxy compound being of a boiling point below that of the boiling point of the product ester and known to be capable of reacting with a monocarboxylic acid of a boiling point lower than the boiling point of the hydroxy compound to form the relatively high boiling ester; feeding an excess of the low boiling acid, as a superheated vapor at a temperature below the boiling point of the product ester, upwardly into the bottom of the reaction zone; and withdrawing product ester from the bottom of the reaction zone, a portion of the bottom liquor being mixed with the added acid prior to its vaporization to insure superheating of the acid vapors to a temperature below the boiling point of the product ester.

4. A process for continuously preparing an ester of a relatively high boiling point in a column still having a reaction zone extending downwardly from a feed section and providing a liquid retention time sufficient for reaction purposes, comprising: flowing a hydroxy organic compound downwardly into the reaction zone of the column from the feed section in the presence of a catalyst, the hydroxy compound being of a boiling point below that of the boiling point of the product ester and known to be capable of reacting with a monocarboxylic acid of a boiling point lower than the boiling point of the hydroxy compound to form the relatively high boiling ester; feeding an excess of the low boiling acid, as a superheated vapor at a temperature below the boiling point of the product ester, upwardly into the bottom of the reaction zone; and withdrawing product ester from the bottom of he column in the form of bottom liquor, a portion of the high boiling bottom liquor being continuously vaporized with the added acid to insure superheating of the latter to be desired temperature.

5. The process of claim 4 wherein the mixture of bottom liquor and acid is vaporized at a rate controlled to maintain a predetermined base temperature.

HENRY W. GRUBB.
LEO M. O'HARA.
KENTON ATWOOD.

REFERENCES CITED

The following references are of record in the file of this patent:

UNITED STATES PATENTS

| Number | Name | Date |
|---|---|---|
| 2,053,029 | Guinot | Sept. 1, 1936 |
| 1,534,752 | Watson | Apr. 21, 1925 |
| 2,173,124 | Meyer et al. | Sept. 19, 1934 |
| 2,224,912 | Hill et al. | Dec. 17, 1940 |
| 1,141,266 | Raschig | June 1, 1915 |
| 1,881,563 | Held et al. | Oct. 11, 1932 |
| 1,898,687 | Rice | Feb. 21, 1933 |

FOREIGN PATENTS

| Number | Country | Date |
|---|---|---|
| 465,983 | Great Britain | May 20, 1937 |